Aug. 1, 1944.　　　A. RAINES ET AL　　　2,354,703
SERVO MECHANISM
Filed June 22, 1942
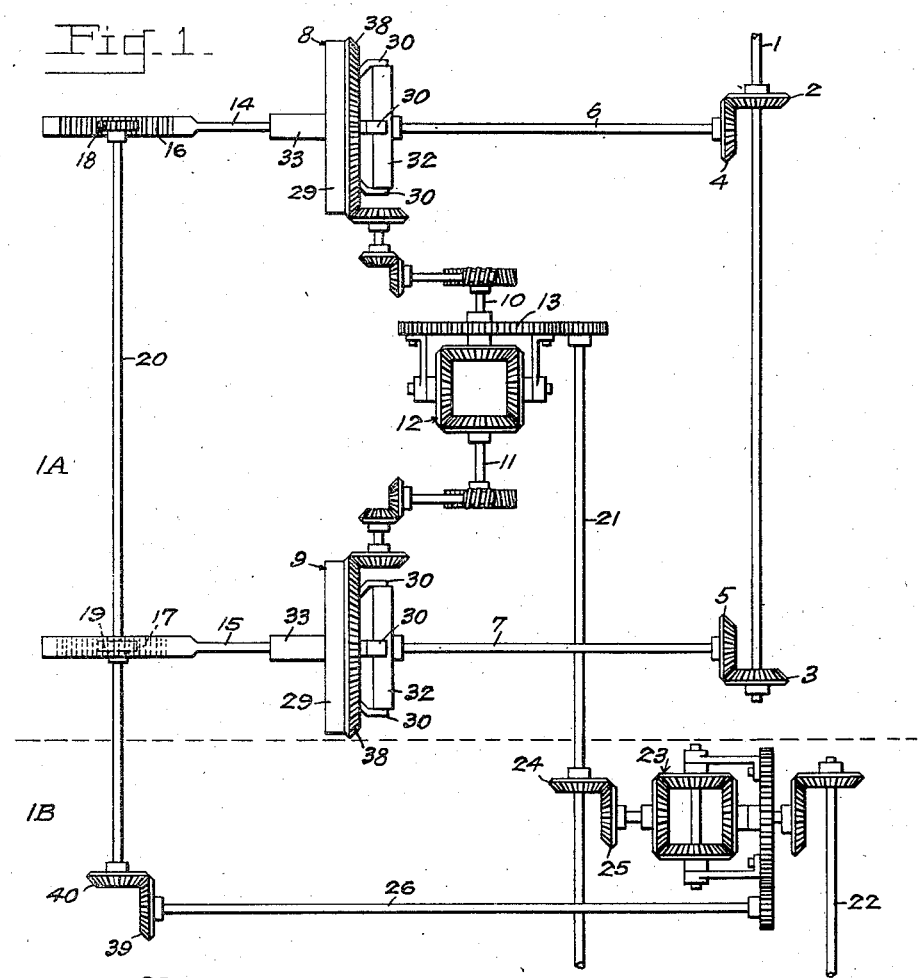
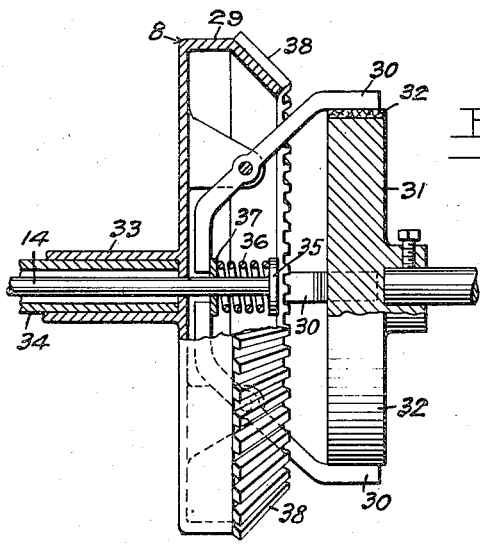
Inventors
Arnold Raines
Arthur C. Martindell Patented Aug. 1, 1944

2,354,703

UNITED STATES PATENT OFFICE 2,354,703

SERVO MECHANISM

Arnold Raines, Philadelphia, and Arthur C. Martindell, Hulmeville, Pa.

Application June 22, 1942, Serial No. 448,028

6 Claims. (Cl. 74—388)

(Granted under the act of March 3, 1883, as amended April 30, 1928; 370 O. G. 757)

The invention described herein may be manufactured and used by or for the Government for governmental purposes, without the payment to us of any royalty thereon.

This invention relates to a device for mechanically controlling a large source of power by means of a relatively small force, and particularly relates to a device in which the control is exercised by means of a differential. According to this invention it is possible to control a large amount of power in a very accurate manner from a small source either when it is desired that the controlling device be used only to indicate the speed and direction of power output or when it is desired that the output exactly conform to the movement of the small source of power.

In the past devices which have permitted accurate control have ordinarily utilized hydraulic principles. Hydraulic operation permits the very accurate adjustment of power, but such devices are very expensive to manufacture, requiring many man-hours of labor. They are also subject to clogging and otherwise getting out of order when subjected to hard service, as in military fire control instruments. Further, such devices behave very sluggishly in cold weather, unless special precautions are taken.

It is therefore the object of this invention to provide a controlling device which operates to extreme accuracy but which does not utilize any hydraulic fluid. It is a further object of this invention to make a controlling device from simple, easily obtainable parts which do not demand extreme precision in their manufacture. Other objects will be apparent on reading the specification.

Referring to the drawing, Figure 1 represents schematically a control built according to the present invention. That portion of the control designated generally as 1A above the dash line represents the basic device which is used when it is desired that the controlling source of power merely indicate the speed and direction of rotation desired in the output. That portion of the control designated 1B below the dash line represents the auxiliary equipment used when it is desired that the output conform exactly to the speed and direction of rotation of the control source of power.

Figure 2 is an elevational view, partly in cross section, of one of the friction clutches used to operate the control.

Referring to the drawing by reference characters, there is shown a shaft 1 which is operatively connected to a source of power having a substantially constant speed. Shaft 1 is provided with gears 2 and 3 which transmit power from shaft 1 through gears 4 and 5 to shafts 6 and 7. Shafts 6 and 7, in turn cause friction clutches 8 and 9 to rotate, which in turn cause the primaries 10 and 11 of a conventional differential 12 to rotate. It is apparent that no movement will be produced on the secondary 13 of the differential if the friction is equal in clutches 8 and 9, for the reason that the primaries will be rotated at equal speeds, in opposite directions, and the differential units 12 will therefore idle.

Friction clutches 8 and 9 have rods 14 and 15 connected to them (the exact functioning of these clutches will be later explained) which are capable of changing the degree of engagement of the clutches. The rods terminate in racks 16 and 17, rack 16 being disposed so that it will engage the under portion of gear 18 on shaft 20 and rack 17 being disposed so that it will engage the upper portion of gear 19 on the same shaft.

When shaft 20 is turned, rods 14 and 15 move in opposite directions. In this manner, shaft 20 can be used as a control, so that turning it to the proper position either clutch 8 or 9 can be made to predominate so that the secondary 13 of differential 12 can be made to turn in either direction at any desired speed. The secondary 13 of differential 12 is geared to shaft 21, so that the output power may be taken from shaft 21.

It is necessary that the gears transmitting the power from the friction clutches to the primaries of differential 12 be of the non-overhauling type. This is necessary for the reason that when the load on the secondary is large and one of the friction clutches is substantially out of engagement there is a tendency for one primary to drive the other primary rather than the secondary of the differential. For this reason the drive is shown through worm gears. The same result can be achieved with spur or bevel gears if a pawl or similar device is used to prevent reverse motion.

When it is desired that the device be used as a follow-up, the controlling source of power is fed into a shaft 22 which is connected to one of the primaries of differential 23. The output of shaft 21 is then connected to the other primary of differential 23 by means of gears 24 and 25. The secondary of differential 23 is then connected to the control shaft 20 by means of shaft 26 and gears 39, 40. Therefore, instead of shaft 20 being controlled manually, it is controlled mechanically by the operation of the secondary of differential 23.

To illustrate the operation of this device, assume that shaft 1 is rotating in a counterclockwise direction. (In the following it is assumed that the drawing is viewed from either the bottom or right hand side of the page.) This causes clutch 8 to revolve in clockwise direction and clutch 9 to revolve counterclockwise. So long as there is no turning of shaft 22, the differential 12 will be neutralized so that shaft 21 will remain stationary. Now if shaft 22 is rotated counterclockwise the right hand primary of differential 23 and hence the secondary thereof will be displaced clockwise, the left hand primary being immobilized at the worm gears on differential 12 and shaft 26 will be displaced counterclockwise as will be shaft 20. This causes rack 17 to move to the left and rack 16 to move to the right thereby decreasing the friction of clutch 8 and increasing the friction in clutch 9. Thus clutch 9 will dominate so that the secondary of differential 12 will revolve clockwise and shaft 21 counterclockwise. This will displace the left-hand primary of differential 23 in a counterclockwise manner, counteracting the displacement caused by shaft 22 on the right-hand primary and tending to shut off the flow of power to shaft 21 when it catches up with shaft 22.

Referring to Figure 2 which relates to the preferred embodiment of the friction clutch which forms a part of this invention, there is shown a housing 29 which carries a plurality of pivotally mounted arms 30 which contact a friction wheel 31. Friction wheel 31 preferably has a surface of friction material 32 such as asbestos, raw hide or other materials such as are used for brake linings. Another particularly suitable material is carbon which gives a very smooth transfer of power since it does not tend to grab. Housing 29 has a hollow shaft 33 through which a control arm such as 14 passes as well as a hollow shaft 34. The inner end of the control arm has a retainer 35 for compressing and releasing a spring 36. This spring presses against the inner ends of the arms 30 through a washer 37 and tends to press the outer ends of the arms against the friction wheel 31. The washer 37 acts as an antifriction bearing and used to prevent direct contact between the spring and the arm. The outside of housing 29 may be provided with gear teeth 38 or other suitable means of transmitting power.

In operation, spring 36 tends to press arms 30 against the surface of friction wheel 31, so that the housing 29 and wheel 31 will tend to revolve as a unit. However, centrifugal force will tend to move arms outwardly so that they will lose contact with the friction wheel when a certain speed is reached. In normal operation there will be some slippage of both clutches. The control arm 14 which extends through the center of the housing 29 is used to increase or decrease the tension on spring 36. By varying the tension on the spring any degree of engagement of the clutch can be obtained.

We claim:

1. In apparatus of the class described, the combination of a source of power, a differential having a pair of input gears, a coupling device having a driving member connected to the said source of power and a driven member connected to one of the said pair of differential input gears to drive the said gear in a predetermined direction, a second coupling device having a driving member connected to the said source of power and a driven member connected to the other of the said pair of differential input gears to drive the said other gear opposite to the said predetermined direction, the degree of engagement between the driving and driven members of both said coupling devices being variable, and manually operated means for varying the degree of engagement of the both said coupling devices in reverse ratio.

2. The combination according to claim 1 wherein the said two coupling devices are friction clutches.

3. The combination according to claim 1 wherein the said connections between the driven members of both said coupling devices to the input gears of the differential include means preventing a reversal of direction of transmission of power from the coupling devices to the differential.

4. The combination according to claim 1 wherein the driven members of both said coupling devices are connected to the input gears of the differential through worm gears.

5. In apparatus of the class described, the combination of a source of power, a differential having a pair of input gears, a coupling device having a driving member connected to the said source of power and a driven member connected to one of the said pair of differential input gears, a second coupling device having a driving member connected to the said source of power and a driven member connected to the other of the said pair of differential input gears, the degree of engagement between the driving and driven members of both said coupling devices being variable, and manually operated means for varying the degree of engagement of the both said coupling devices.

6. In apparatus of the class described, the combination of a source of power, a differential having a pair of input gears, a coupling device having a driving member connected to the said source of power and a driven member connected to one of the said pair of differential input gears to drive the said gear in a predetermined direction, a second coupling device having a driving member connected to the said source of power and a driven member connected to the other of the said pair of differential input gears to drive the said other gear opposite to the said predetermined direction, the degree of engagement between the driving and driven members of both said coupling devices being variable, means for varying the degree of engagement of the both said coupling devices in reverse ratio, a manual control, and a second differential the input gears of which are connected to the said manual control and to the output gear of the first said differential, the output gear of the second said differential being connected to the said coupling varying means.

ARNOLD RAINES.
ARTHUR C. MARTINDELL.